(12) United States Patent
Miller, Jr.

(10) Patent No.: US 7,401,108 B2
(45) Date of Patent: Jul. 15, 2008

(54) RANDOM NOISE GENERATOR AND A METHOD FOR GENERATING RANDOM NOISE

(75) Inventor: Robert H. Miller, Jr., Loveland, CO (US)

(73) Assignee: Avago Technologies General IP Pte Ltd, Singapore (SG)

( * ) Notice: Subject to any disclaimer, the term of this patent is extended or adjusted under 35 U.S.C. 154(b) by 711 days.

(21) Appl. No.: 10/946,407

(22) Filed: Sep. 21, 2004

(65) Prior Publication Data

US 2005/0038840 A1    Feb. 17, 2005

Related U.S. Application Data

(63) Continuation-in-part of application No. 10/140,766, filed on May 8, 2002, now Pat. No. 7,007,060.

(51) Int. Cl.
*G06F 1/02* (2006.01)
*G06G 7/00* (2006.01)

(52) U.S. Cl. .................... 708/250; 708/801

(58) Field of Classification Search ........... 708/250, 708/252, 255, 801
See application file for complete search history.

(56) References Cited

U.S. PATENT DOCUMENTS

| 4,052,720 A | * | 10/1977 | McGregor et al. ........ 340/522 |
| 6,459,722 B2 | * | 10/2002 | Sriram et al. ........... 375/130 |
| 6,483,748 B2 | * | 11/2002 | Futatsuya et al. ....... 365/185.11 |
| 2004/0053429 A1 | * | 3/2004 | Muranaka ............... 438/17 |
| 2006/0020647 A1 | * | 1/2006 | Simon et al. ............ 708/250 |

* cited by examiner

*Primary Examiner*—Chuong D Ngo

(57) ABSTRACT

A random noise signal generator circuit comprising a random noise source that produces a random noise signal, an amplification circuit that amplifies the random noise signal to produce an amplified random noise signal, a feedback loop having a DC offset correction circuit, and a summer. The DC offset correction circuit processes a fed back portion of the amplified random noise signal to produce a DC offset correction signal. The summer sums the random noise signal produced by the random noise source and the DC offset correction signal to produce a summed signal. The summer is electrically coupled to the amplification circuit for providing the summed signal to the amplification circuitry. The amplification circuitry amplifies the summed signal to produce a random noise output signal.

18 Claims, 4 Drawing Sheets

RANDOM NOISE GENERATOR AND A METHOD FOR GENERATING RANDOM NOISE

CROSS-REFERENCE TO RELATED APPLICATIONS

This application is a continuation-in-part of application Ser. No. 10/140,766, filed on May 8, 2002, now U.S. Pat. No. 7,007,060 published on Jan. 8, 2004 as published application No. US 2004/0006580, entitled "RANDOM BIT STREAM GENERATION BY AMPLIFICATION OF THERMAL NOISE IN A CMOS PROCESS", which is hereby incorporated by reference herein in its entirety.

BACKGROUND OF THE INVENTION

Random number generation is an important aspect of many digital and electronic applications. For example, in the field of cryptography, random number generation is key to encryption algorithms. A random bit stream is a sequence of binary signals lacking discernible patterns or repetition over time.

In electrical circuitry, a random bit stream may be generated from a source that naturally exhibits random characteristics. For example, thermal noise in a CMOS field effect transistor (FET) channel injects a random component into the value of the current passing through that channel which can then be amplified to obtain a signal that is sufficiently random for a particular use. It is generally not possible to obtain a purely random signal by practical means, although it is possible in theory. For practical applications, what is sought is the ability to generate a signal that has a high degree of randomness, and thus a low degree of predictability, and which is suitable for use for the particular practical application.

However, generating a bit stream that has a sufficiently high degree of randomness based on a physical random phenomenon can be problematic. As is known in the art, the mere act of sampling the signal may interfere with the degree of randomness of the random physical phenomenon being measured. For example, in order to ensure a high degree of randomness, or unpredictability, the measurement circuitry should not introduce any bias into the probability that the measured value will be translated into a binary 0 or a binary 1. For example, if a sampling circuit measures a voltage level of noise at a given moment in time and compares it to a known threshold generated by the sampling circuitry, process and/or voltage and/or temperature variations may cause a drift in the threshold value over time, which may skew the sampling circuitry to translate more sampled values to one bit value or the other. Thus, the process is no longer truly random since there is no longer an equal chance of sampling a "1" or a "0".

Current random bit stream generators inject a bias into the random bit stream generators that reduces the degree of unpredictability of the bit stream. A need exists for a method and an apparatus for generating a bit stream that has a sufficiently high degree of randomness (i.e, unpredictability) to be usable for a particular application. In particular, it would be desirable to generate a bit stream from a naturally occurring randomness source within the random bit generator circuitry itself. In addition, a need exists for preventing drift from randomness or unpredictability over time due to process and/or voltage and/or temperature variations.

SUMMARY OF THE INVENTION

The present invention provides a random noise signal generator circuit comprising a random noise source that produces a random noise signal, an amplification circuit that amplifies the random noise signal to produce an amplified random noise signal, a feedback loop having a direct current (DC) offset correction circuit, and a summer. The DC offset correction circuit processes a fed back portion of the amplified random noise signal to produce a DC offset correction signal. The summer sums the random noise signal produced by the random noise source and the DC offset correction signal to produce a summed signal. The summer is electrically coupled to the amplification circuit for providing the summed signal to the amplification circuitry. The amplification circuitry amplifies the summed signal to produce a random noise output signal.

The present invention also provides a method for generating a random noise signal. In accordance with the method, a random noise signal is generated by a random noise source. The random noise signal is then amplified to produce an amplified random noise signal. A fed back portion of the amplified random noise signal is then processed by a DC offset correction circuit to produce a DC offset correction feedback signal. A random noise signal generated by the random noise source is then summed with the feedback signal to produce a summed signal. The summed signal is then amplified to produce a random noise output signal.

One of the primary advantages of using the DC offset correction feedback signal is that it nulls out DC bias offsets that normally occur so that the alternating current (AC) noise signal is amplified by the gain stages of the amplification circuit without amplifying large DC bias offsets. Avoiding amplifying large DC bias offsets prevents a bias from existing on the output of the amplification circuit, which would make the noise signal less random. In addition, because the DC offset correction feedback signal reduces the DC bias offset amplified by the amplification circuit, the amplification circuit can apply greater gain so that the output of the amplification circuit has sufficiently large voltage swings to be sampled without decreasing the unpredictability of the signal.

These and other features of the invention will become apparent from the following description, drawings and claims.

DETAILED DESCRIPTION OF THE INVENTION

Noise sources in a circuit such as, for example, an FET channel, introduce a certain amount of unpredictability in the signals being passed through them. The term "unpredictability", as that term is used herein, is intended to mean that, given a perfect knowledge of the circuit and of the waveform of a signal up to a time "t", the value of the signal within some limit of precision at time "t+Δt" cannot be predicted. As the odds of a prediction being wrong approach 50% each time a prediction is made, the result can be regarded as a random bit string. The term "random", as that term is used herein, is not intended necessarily to denote pure randomness in the theoretical sense. A signal does not need to be purely random in order for it to be sufficiently random to be useful. The degree of randomness, or unpredictability, needed depends on the particular application of use. Therefore, the term "random" will be used herein to indicate a degree of unpredictability or randomness sufficient for a given use.

Some of the primary goals of the present invention are 1) to provide an apparatus that has a behavior that is very sensitive to the noise injected by the randomness noise source and therefore is as "unpredictable" or "random" as possible, 2) to generate an output that has this high degree of unpredictability embedded in it to enable the unpredictability to be effectively tested by downstream circuitry, such as, for example, a comparator. This implies a substantial voltage excursion on the output at a reasonable current drive, 3) to correct for interfering elements of the apparatus, such as, for example, DC bias offsets that cause bias to be injected into the result, high Q oscillations that destroy unpredictability, etc., and 4) to provide an apparatus with sufficient unpredictability in its output that at the sampling rate required for the particular use of the apparatus, the outcome of the output test cannot be predicted given a complete knowledge of all previous outcomes. The manner in which these and other goals of the present invention are achieved will now be described with reference to FIGS. 1-4.

Figure 1:
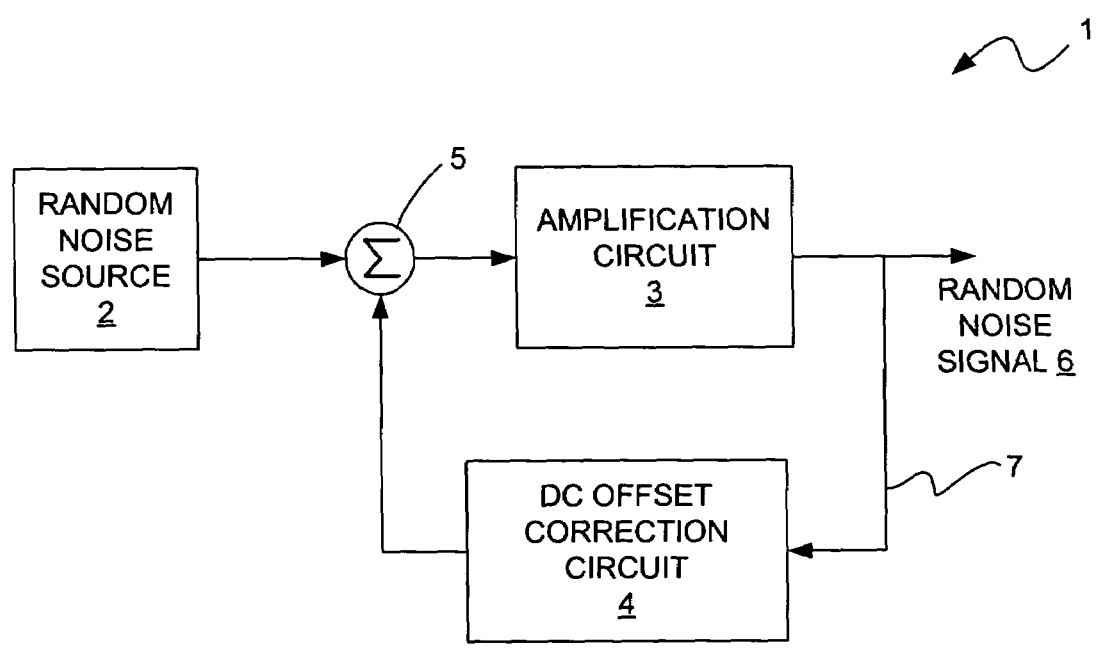
FIG. 1 illustrates a block diagram of the random noise generator of the present invention in accordance with an embodiment.

FIG. 1 illustrates a block diagram of the random noise generator circuit 1 of the present invention in accordance with an embodiment. The random noise generator circuit 1 comprises a random noise source 2 that generates a random noise signal, an amplification circuit 3 that amplifies the random noise signal, a DC offset correction circuit 4 that processes the amplified noise signal in a feedback loop to produce a feedback signal, and a summing node 5 that sums the feedback signal and the random noise signal 6.

The amplification circuit 3 preferably has a relatively high gain to provide the output signal 6 with a large enough voltage swing for the circuitry downstream (not shown) of the random noise generator circuit that samples the output signal 6 to generate a random bit stream. The DC offset correction circuit 4 corrects for DC bias offsets in the feedback loop 7. Such offsets may result from process, temperature and/or voltage variations. As described above, the offsets may result in biases in the output signal 6 that prevent the output 6 from having the desired degree of randomness. The DC offset correction circuit 4 produces a feedback signal that reduces the DC offset signal amplified by the amplification circuit 3, thereby reducing bias in the output signal 6.

The DC offset correction circuit 4 produces a relatively low gain signal that preferably is set so that the loop 7 is just below or just above the threshold of oscillation. In the absence of the feedback, the random noise generator circuit 1 is essentially a ring oscillator. The feedback makes the circuit 1 essentially an asymmetrical ring oscillator that is either barely stable or barely unstable. Preferably, the loop gain is adjusted by the DC offset correction circuit 4 to keep the loop 7 at a point of marginal stability/instability. If the loop gain is increased too much, the loop 7 will oscillate with a high enough Q that the value of the output signal 6 begins to become more and more predictable, although the voltage swing of the output signal 6 is sufficiently large to be usable by the downstream sampling circuitry. If the loop gain is decreased too much, the voltage swing of the output signal 6 decreases rapidly and becomes to small to be usable by the downstream sampling circuitry, although the value of the output signal 6 becomes increasingly unpredictable. The DC offset correction circuit 4 maintains the loop gain at a level that keeps the loop 7 at the point of marginal stability/instability, which ensures that the voltage swing of the output signal 6 is sufficiently large and that the value of the output signal 6 is sufficiently unpredictable.

The DC offset correction circuit 4 may be configured in various ways with various components. An example of one particular type of circuit that can be used as the DC offset correction circuit 4 is a lowpass filter. Another example of a particular type of circuit that can be used as the DC offset correction circuit 4 is an automatic gain control (AGC) circuit. An AGC circuit may be used for this purpose by setting the loop gain at precisely the correct value to be barely stable over all process and operating conditions. Other filtering techniques or transfer functions can also be used to adjust circuit performance to achieve the goals of the present invention.

Figure 2:
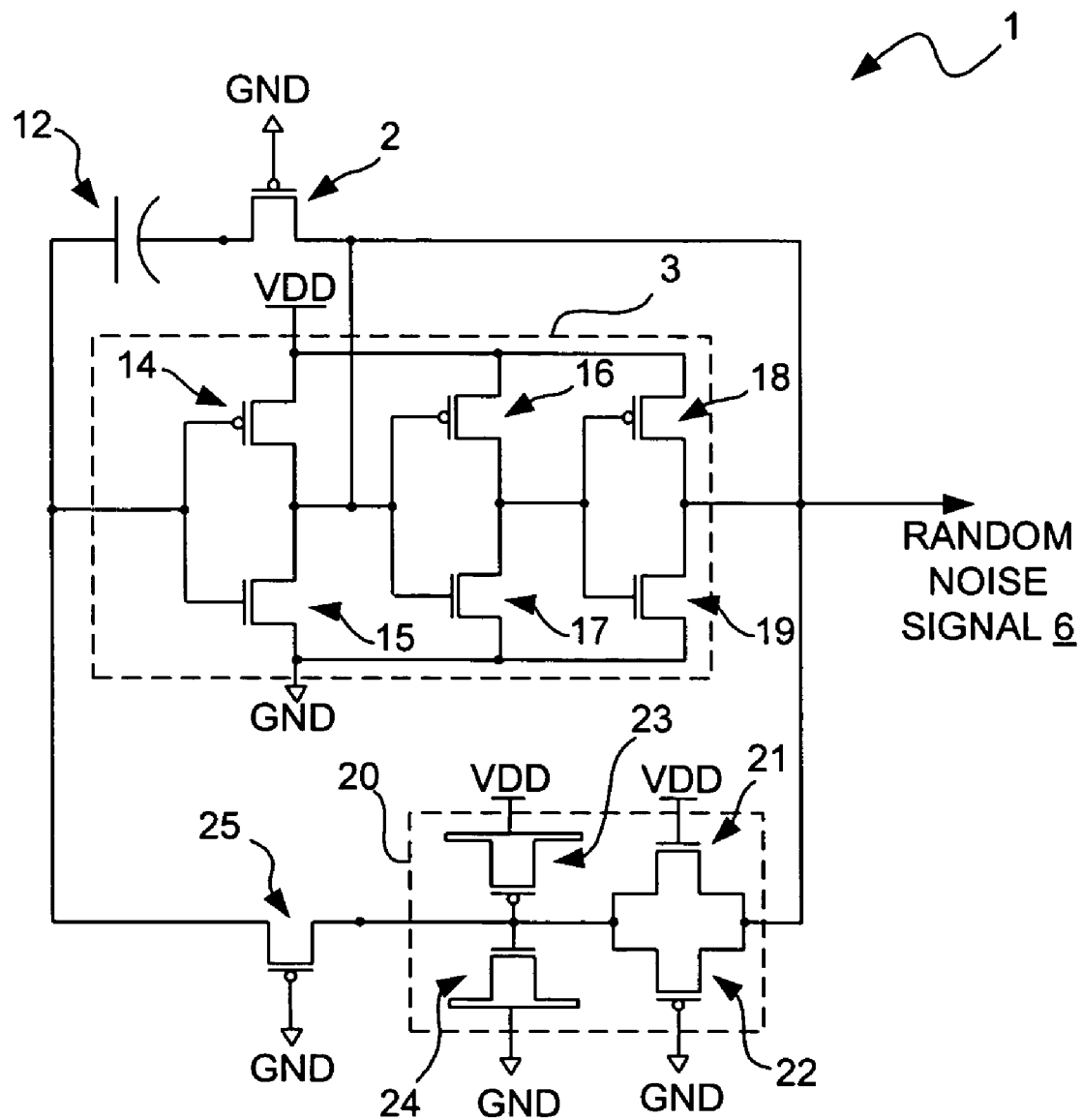
FIG. 2 illustrates a schematic diagram of the random noise generator shown in FIG. 1 in accordance with an embodiment.

FIG. 2 is a schematic diagram of the random noise generator circuit 1 in accordance with an exemplary embodiment, wherein the DC offset correction circuit is a lowpass filter. In accordance with this embodiment, the random noise source 2 is a thermal noise source such as, for example, a channel of a P field effect transistor (PFET). The PFET 2 functions as the thermal noise source. The width-to-length ratio of PFET 2 may be, for example, 0.3/0.64. A parallel-plate capacitor 12 AC-couples current from the drain of PFET 2 to the input of the amplification circuit 3. The capacitor 12 may have a value of, for example, 13 femtofarads (Ff).

Preferably, the amplification circuit 3 comprises cascaded stages that increase in drive strength in the direction from the input stage to the output stage. Each stage includes an inverter comprising a PFET connected in series with an N field effect transistor (NFET). The inverter of the input stage comprises PFET 14 and NFET 15. The inverter of the second stage comprises PFET 16 and NFET 17. The inverter of the output stage comprises PFET 18 and NFET 19. Although the amplification circuit 3 is shown as having three stages, the amplification circuit 3 may have as few as one stage and as many as three or more stages.

To provide the inverters with successively increasing drive strength, the sizes of the inverters increase from a smaller size at the input stage to a larger size at the output stage. For example, for the CMOS design shown in FIG. 2, the width-to-length ratios of PFETs 14, 16 and 18 are 0.8, 1.6 and 3.2, respectively, and the width-to-length ratios of NFETs 15, 17 and 19 are 0.3, 0.6 and 1.2, respectively. These FET aspect ratios provide the amplification circuit 3 with sufficiently high drive strength to ensure that the output signal 6 has a large enough voltage swing for the downstream sampling circuitry.

The lowpass filter circuit 20 filters out the high frequency components from the random noise signal 6. The lowpass filter circuit 20 includes an NFET 21 and a PFET 22 connected in parallel and having their gates connected to the supply voltage, VDD, and ground, GND, respectively. The connection of NFET 21 and PFET 22 in parallel forms the resistor of the lowpass filter circuit 20. The lowpass filter circuit 20 also includes a PFET 23 and an NFET 24. The source and drain of PFET 23 are connected together and to VDD. The source and drain of NFET 24 are connected together and to GND. The gates of PFET 23 and NFET 24 are connected to the feedback loop and are conductively coupled in series with the parallel configuration of NFET 21 and PFET 22. The connection of the PFET 23 and NFET 24 forms the capacitor of the RC circuit 4. The width-to-length ratio of NFET 21 may be, for example, 0.3/3. The width-to-length ratio of PFET 22 may be, for example, 0.3/1. The width-tolength ratio of PFET 23 may be, for example, 20/0.24. The width-to-length ratio of NFET 24 may be, for example, 20/0.24.

A PFET 25 connected in series with the lowpass filter circuit 20 functions as a resistor. The combination of PFET 25 and capacitor 12 forms the summing junction at the input of the amplification circuit 3. In essence, these components together make up the summing junction 5 shown in FIG. 1. The width-to-length ratio of PFET 25 may be, for example, 0.3/0.565.

Figure 3:
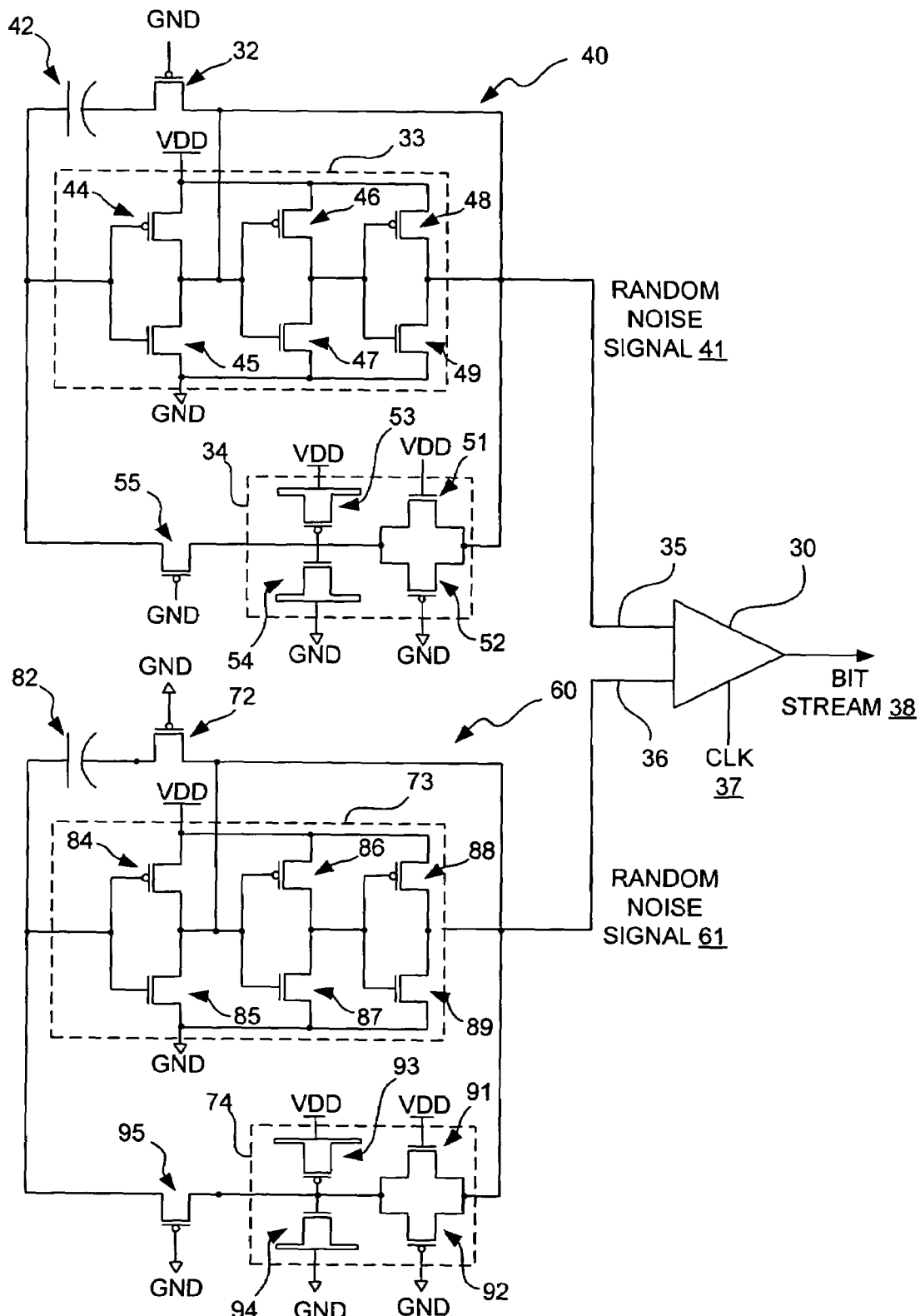
FIG. 3 illustrates a schematic diagram of two of the random noise generators shown in FIG. 2 with their outputs coupled to inputs of a comparator that resolves the signals on its inputs into a random bit stream.

FIG. 3 illustrates a schematic diagram of a random bit generator circuit 30 having two random noise generator circuits 40 and 60 of the type shown in FIG. 2 with their outputs coupled to inputs of a comparator 30. The comparator 30 resolves the signals on its inputs 35 and 36 into a random bit stream 38. A clock signal 37 controls the timing of the sampling of the signals on inputs 35 and 36. The components shown in FIG. 3 labeled with reference numerals 32-34 and 42-55 are identical to the components shown in FIG. 2 labeled with reference numerals 2-4 and 12-25, respectively. Likewise, the components shown in FIG. 3 labeled with reference numerals 72-74 and 82-95 are identical to the components shown in FIG. 2 labeled with reference numerals 2-4 and 12-25, respectively. Therefore, the operations of components 32-34, 42-55, 72-74 and 82-95 shown in FIG. 3 will not be described.

As indicated above, it is known that offset voltages in the comparator 30 (e.g., due to process/temperature/voltage variations) can lead to biases in the comparator 30 that decrease the randomness of the values of the bit stream 38. In other words, the offset voltages can lead to the comparator 30 having a tendency to output a digital 1 instead of a digital 0, or vice versa. In accordance with the present invention, the comparator 30 preferably is sufficiently large in size that any offset voltage produced by the comparator 30 will be much smaller in magnitude than the comparator input voltage swing (i.e., the difference between the voltages on inputs 35 and 36), and thus will have little or know biasing effect on the bit stream 38. In addition, because the lowpass filter circuits 34 and 74 provide relatively low gain that keeps the loops just around the oscillation threshold level, the gain provided by the amplification circuits 33 and 73 can be made relatively large so that the voltages on the comparator inputs 35 and 36 are relatively large, which means that the comparator input voltage swing will be relatively large. The combination of these features of the present invention ensures that the bit stream 38 will be sufficiently random.

Figure 4:
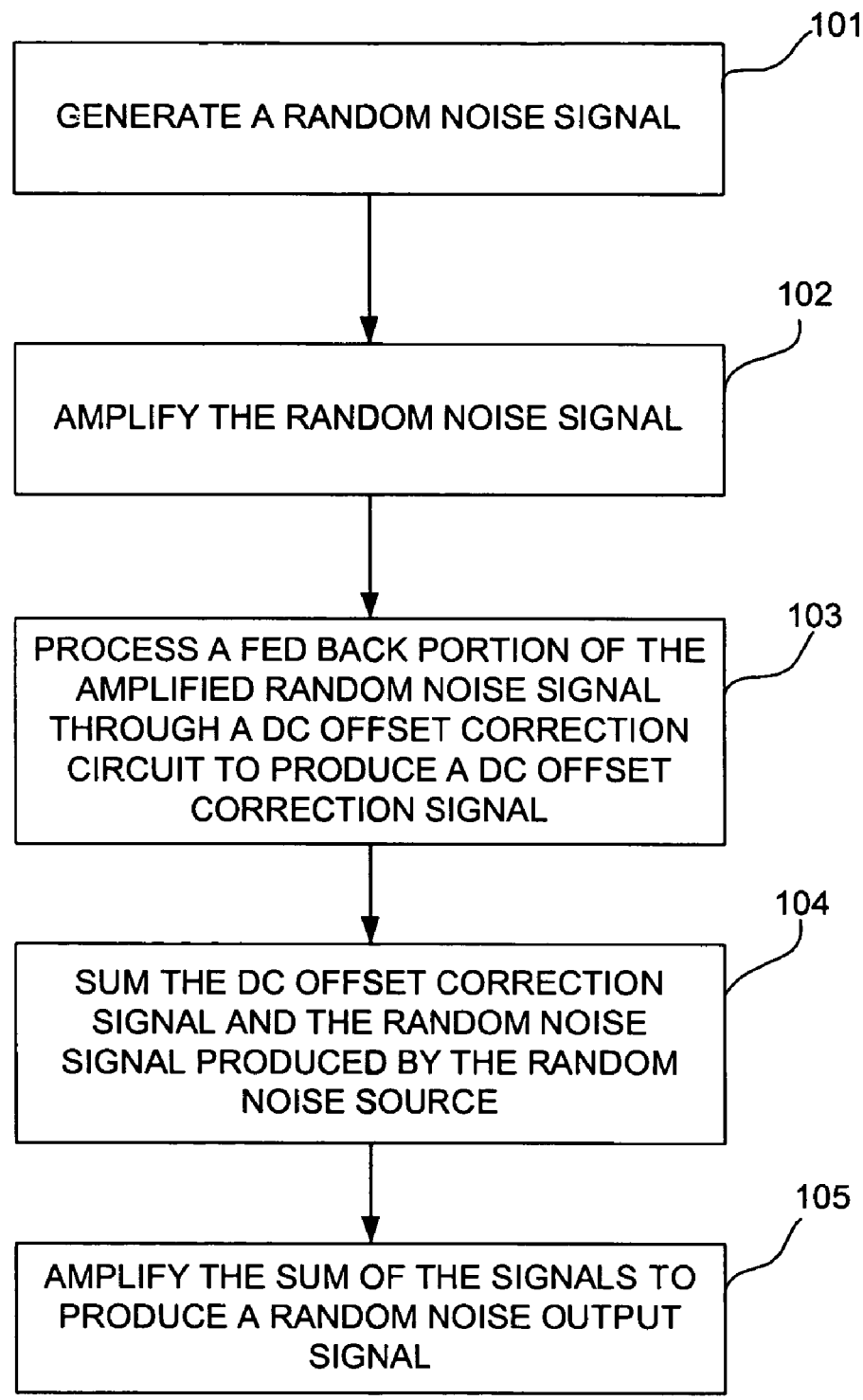
FIG. 4 illustrates a flow chart of the method of the present invention in accordance with an embodiment for generating random noise.

FIG. 4 illustrates a flow chart that represents the method of the present invention in accordance with an embodiment for generating a random noise signal. First, a random noise signal is generated by a random noise source, such as, for example, a FET channel being used as the thermal noise source. This step is represented by block 101. An amplification circuit amplifies the random noise signal to generate an amplified random noise signal, as indicated by block 102. At least a portion of the amplified random noise signal is then processed by a DC offset correction circuit to produce a DC offset correction signal, as indicated by block 103. The DC offset correction signal is then summed with the random noise signal produced by the random noise source, as indicated by block 104. The sum of the random noise signal and the filtered signal is then amplified by the amplification circuitry to produce a random noise output signal, as indicated by block 105.

In order to generate a random bit stream, the process described above with reference to FIG. 4 is performed using two identical random noise generator circuits, such as those shown in FIG. 3, and the respective random noise output signals are provided to a comparator circuit as described above with reference to FIG. 3, which compares the output signals and outputs a digital 1 or a digital 0 depending on the outcome of the comparison.

It should be noted that the present invention has been described with reference to particular embodiments and that the present invention is not limited to the embodiments described herein. For example, the invention is not limited to the particular configuration of the random noise generator circuit shown in FIG. 2. The configuration shown in FIG. 2 is only one of many ways of implementing the circuit shown in FIG. 1. Other filtering techniques or transfer functions can be used to adjust circuit performance to achieve the goals of the present invention. As stated above, a feedback circuit that is adjusted by an AGC circuit may be used for this purpose by setting the loop gain at precisely the correct value to be barely stable over all process and operating conditions. In addition, although the invention has been described with reference to FET technology, and in particular with reference to CMOS-FET technology, the present invention is also applicable to other IC technologies and processes. Those skilled in the art will understand the manner in which the other modifications can be made that are also within the scope of the present invention.

What is claimed is:

1. A random noise signal generator circuit comprising:
a random noise source that produces a random noise signal;
an amplification circuit that amplifies the random noise signal to produce an amplified random noise signal;
a feedback loop having a DC offset correction circuit, the feedback loop passing a fed back portion of the amplified random noise signal through the DC offset correction circuit to produce a DC offset correction signal, the DC offset correction circuit having a gain substantially at a threshold that maintains the feedback loop at a point of marginal stability; and
a summer that sums a random noise signal produced by the random noise source and the DC offset correction signal to produce a summed signal, the summer being electrically coupled to the amplification circuit for providing the summed signal to the amplification circuitry, the amplification circuitry amplifying the summed signal to produce a random noise output signal.

2. The random noise signal generator circuit of claim 1, wherein the random noise source is a thermal noise source.

3. The random noise signal generator circuit of claim 1, wherein the DC offset correction circuit is a lowpass filter circuit.

4. The random noise signal generator circuit of claim 1, wherein the DC offset correction circuit is an automatic gain control (AGC) circuit.

5. The random noise signal generator circuit of claim 1, wherein the amplification circuitry includes at least a first gain stage and a second gain stage, the second gain stage having a higher gain than the first gain stage, the first gain stage corresponding to an input stage of the amplification circuitry.

6. The random noise signal generator circuit of claim 1, wherein the amplification circuitry includes at least a first gain stage, a second gain stage and a third gain stage, the second gain stage having a higher gain than the first gain stage, the third gain stage having a higher gain than the second gain stage, the first gain stage corresponding to an input stage of the amplification circuitry.

7. The random noise signal generator circuit of claim 1, wherein the summer includes a capacitor electrically coupled to the random noise source and a transistor electrically coupled to the DC offset correction circuit, the transistor functioning as a resistor, the transistor and capacitor being electrically coupled to each other and to an input of the amplification circuitry.

8. The random noise signal generator circuit of claim 1, wherein the DC offset correction circuit is a lowpass filter circuit that includes transistors connected to operate as a capacitor and transistors connected to operate as a resistor to form a resistor-capacitor (RC) circuit.

9. A method for generating a random noise signal, the method comprising:
   generating a random noise signal with a random noise source;
   amplifying the random noise signal to produce an amplified random noise signal;
   feeding back a signal in a feedback loop by:
      processing a fed back portion of the amplified random noise signal by a DC offset correction circuit to produce a DC offset correction signal;
      summing a random noise signal generated by the random noise source with the DC offset correction signal to produce a summed signal; and
      amplifying the summed signal to produce a random noise output signal;
   wherein the processing step is performed with a gain substantially at a threshold that maintains the feedback loop at a point of marginal stability.

10. The method of claim 9, wherein the random noise source is a thermal noise source.

11. The method of claim 9, wherein the DC offset correction circuit is a lowpass filter circuit and wherein the DC offset correction signal is a lowpass filtered signal.

12. The method of claim 9, wherein the step of amplifying the random noise signal includes inputting the random noise signal to amplification circuitry that includes at least a first gain stage and a second gain stage, the second gain stage having a higher gain than the first gain stage, the first gain stage corresponding to an input stage of the amplification circuitry.

13. The method of claim 9, wherein the step of amplifying the random noise signal includes inputting the random noise signal to amplification circuitry that includes at least a first gain stage, a second gain stage and a third gain stage, the second gain stage having a higher gain than the first gain stage, the third gain stage having a higher gain than the second gain stage, the first gain stage corresponding to an input stage of the amplification circuitry.

14. The method of claim 9, wherein the summing step includes summing the signals with a summer that includes a capacitor electrically coupled to the random noise source and a transistor electrically coupled to the DC offset correction circuit, the transistor functioning as a resistor, the capacitor and transistor being electrically coupled to each other to form a summing node at an input to the amplification circuitry.

15. A method for generating a series of random bits, the method comprising:
   generating a first random noise signal with a first random noise source;
   generating a second random noise signal with a second random noise source;
   amplifying the first random noise signal in first amplification circuitry to produce a first amplified random noise signal;
   amplifying the second random noise signal in second amplification circuitry to produce a second amplified random noise signal;
   processing a fed back portion of the first amplified random noise signal by a first DC offset correction circuit to produce a first DC offset correction signal;
   processing a fed back portion of the second amplified random noise signal by a second DC offset correction circuit to produce a second DC offset correction signal;
   summing a random noise signal generated by the first random noise source with the first DC offset correction signal to produce a first summed signal;
   summing a random noise signal generated by the second random noise source with the second DC offset correction signal to produce a second summed signal;
   amplifying the first summed signal to produce a first random noise output signal;
   amplifying the second summed signal to produce a second random noise output signal; and
   comparing the first random noise output signal with the second random noise output signal and producing a digital 1 or a digital 0 depending on results of the comparison;
   wherein the step of processing a fed back portion of the first amplified random noise signal is performed with a gain substantially at a threshold that maintains a feedback loop involving the first amplification circuitry and the first DC offset correction circuit at a point of marginal stability; and
   wherein the step of processing a fed back portion of the second amplified random noise signal is performed with a gain substantially at a threshold that maintains a feedback loop involving the second amplification circuitry and the second DC offset correction circuit at a point of marginal stability.

16. The method of claim 15, wherein the first and second random noise sources are thermal noise sources.

17. The method of claim 15, wherein the first and second DC offset correction circuits are lowpass filter circuits.

18. The method of claim 15, wherein the first and second DC offset correction circuits are automatic gain control circuits.

* * * * *